Figure 1:
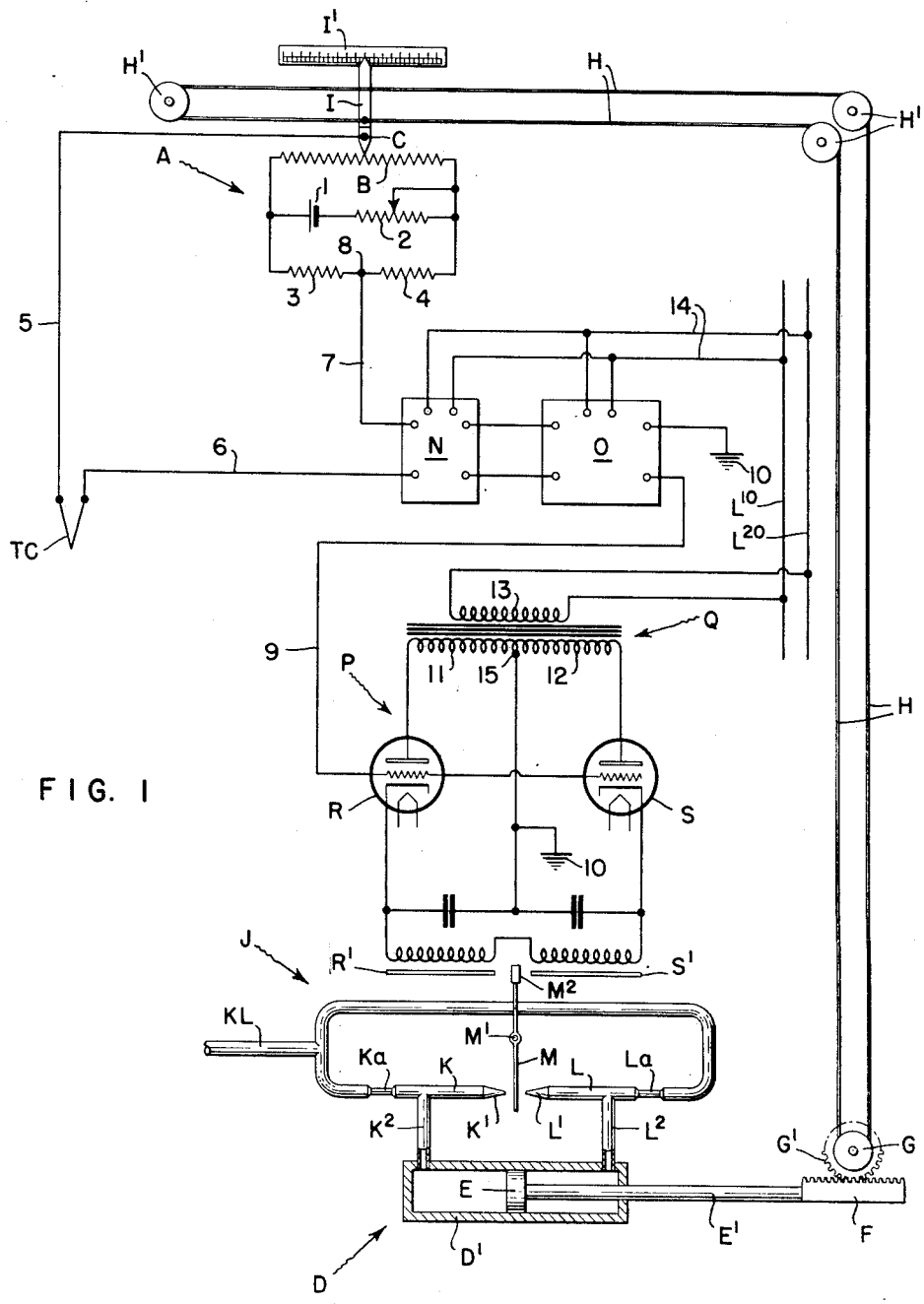

Dec. 21, 1954      R. MAYER      2,697,417
MEASURING APPARATUS

Filed Dec. 7, 1951      2 Sheets-Sheet 1

INVENTOR.
ROBERT MAYER
BY Arthur H. Swanson
ATTORNEY.

Dec. 21, 1954  R. MAYER  2,697,417
MEASURING APPARATUS
Filed Dec. 7, 1951  2 Sheets-Sheet 2
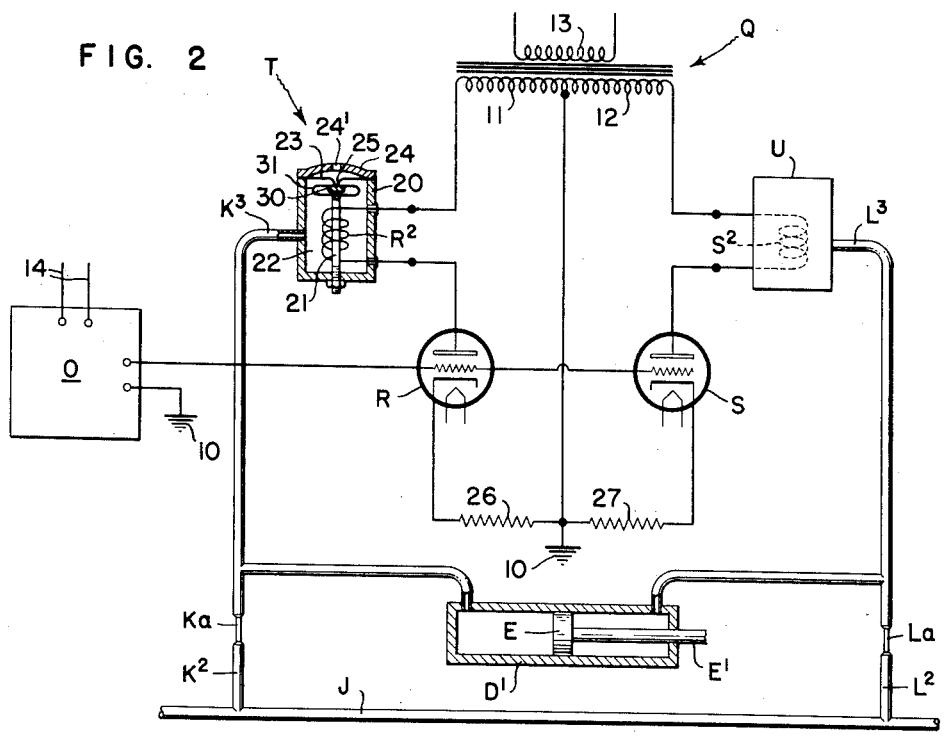
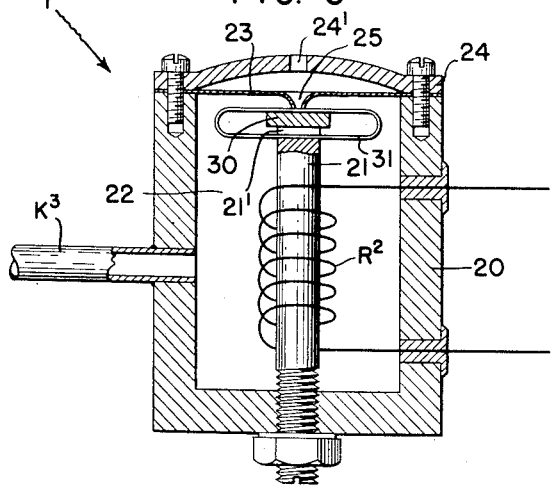
INVENTOR.
ROBERT MAYER
BY Arthur H. Swanson
ATTORNEY.

United States Patent Office 2,697,417
Patented Dec. 21, 1954

2,697,417

MEASURING APPARATUS

Robert Mayer, Havertown, Pa., assignor to Minneapolis-Honeywell Regulator Company, Minneapolis, Minn., a corporation of Delaware Application December 7, 1951, Serial No. 260,397

4 Claims. (Cl. 121—41)

The present invention relates to self-balancing measuring apparatus for use in accurately measuring small electrical quantities such as thermocouple voltages, by a null method. One well-known type of self-balancing measuring apparatus extensively employed for such use is disclosed in the Wills Patent 2,423,540, dated July 8, 1947. In that patent the position of a wiper contact along the slide wire of a potentiometric bridge circuit is adjusted in response to a small electric signal, by a reversibly rotatable two-phase alternating current motor including a control winding connected in the output portion of an electronic amplifying circuit network by which said signal is amplified. Said motor also includes a power winding energized by alternating current of the same frequency, but displaced in phase from the current which flows through the control winding when the motor is in operation.

The general object of the present invention is to provide measuring apparatus of the above mentioned type in which the wiper contact adjustments are made by an air motor of the cylinder and reciprocating piston type, and in which the air motor is controlled through a suitable circuit network which may well be like that of the Wills patent, except that the control winding of the Wills patent is replaced by the windings of two electro-magnetic control devices.

The air motor employed may be similar in type and form to the air motor for relatively adjusting a wiper contact and slide wire as disclosed and claimed in the Moore Patent 2,242,656 of May 20, 1941. However, my motor and motor control apparatus combination differs from the combinations of said prior patents, and have certain advantages over the combination of each of said prior patents for use under some conditions, particularly when air control mechanism is associated with the measuring apparatus to provide control effects on changes in the value of the quantity measured.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 diagrammatically illustrates a desirable embodiment of the present invention;

Fig. 2 diagrammatically illustrates a modification of the mechanism directly controlling the air motor shown in Fig. 1; and Fig. 3 is a section on a larger scale of an electro-magnetic bleed orifice mechanism shown in Fig. 2.

In the desirable embodiment of the invention illustrated by way of example in Fig. 1, the varying temperature of a thermocouple TC is measured by self-balancing measuring apparatus comprising a potentiometric bridge circuit A. The latter includes a slide wire B engaged by a wiper contact C which is adjusted along the slide wire B on and in accordance with variations in the thermocouple voltage. In accordance with the present invention, the wiper contact adjustments are effected by an air motor D. As shown, the motor comprises a cylinder D' with a reciprocating piston E therein and having a stem E' extending through one end wall of the cylinder and connected externally of the latter to a rack bar F. The teeth of the latter are in mesh with a spur gear G' rotating about an axis and connected to and rotating a coaxial pulley G.

The rotation of the pulley G in one direction or the other operates through a flexible transmission element H to move the wiper contact C along the slide wire B in a direction depending on the direction of rotation of said pulley. Ordinarily and as shown in Fig. 1, a pointer or pen I is mechanically connected to the wiper contact C, or is otherwise arranged for movement along a scale I' or over a record chart, in accordance with the movement of the contact C along the slide wire B. The transmission element H may be a cord or wire looped about the pulley G and running over guide pulleys H' and connected to the contact C, so as to move the latter along the slide wire B in accordance with the magnitude and direction of rotation of the pulley G.

As shown, the piston E is caused to move longitudinally in the cylinder D' in one direction or the other by pneumatic means J as the voltage of the thermocouple TC increases or decreases. As shown, the means J comprises a pair of bleed nozzles K and L in alignment with one another and having their discharge orifices K' and L' respectively, facing one another, and adjacent to and on opposite sides of a flapper valve M. The latter is pivoted to turn about an axis M', laterally displaced from the common axis of the bleed nozzles K and L, and located in a plane transverse to said common axis, and approximately midway between the discharge ends of the two bleed nozzles. An armature $M^2$ is attached to the valve M at the opposite side of the pivot M' from the bleed nozzle orifices K' and L'.

Air is supplied to the bleed nozzles K and L through restricted orifices K' and L' respectively, by a supply pipe KL from a source of suitably clean air under a substantially constant pressure. The latter may vary with conditions, but ordinarily it may well be about 20 pounds per square inch. A pipe $K^2$ connects one end of the cylinder chamber D' to the bleed nozzle K between its discharge orifice K' and its flow restriction Ka. Similarly a pipe $L^2$ connects the opposite end of the cylinder chamber D' to the bleed nozzle L between its discharge orifice L' and the associated restriction La. In consequence, if and when on an increase in the temperature of the thermocouple TC the flapper valve M is turned clockwise toward the bleed orifice K' and away from the bleed orifice L', the cylinder pressure acting on the left side of the piston E will be increased and cylinder pressure acting on the right side of the piston E will be decreased. Such cylinder pressure changes cause the piston E to move to the right and rotate the gear G and thereby cause element H to move the wiper contact C to the right along the slide wire B. Conversely, when the flapper valve M is turned counter-clockwise away from the nozzle K on a decrease in the thermocouple temperature, the piston E will be moved to the left and will thereby cause the wiper contact C to be moved to the left along the slide wire resistor B'.

Insofar as the apparatus shown in Fig. 1 has been described in detail, it includes nothing claimed as novel herein. The bridge circuit A, shown diagrammatically in Fig. 1, is of conventional form, comprising a battery 1 and a current regulating, variable resistor 2 connected in series with one another and with the slide wire B. The bridge circuit also includes a branch comprising resistors 3 and 4 connected in series with one another and with the battery 1 and resistor 2, and in parallel with the slide wire resistor B. One terminal of the thermocouple TC is connected by a conductor 5 to the slider contact C and its second terminal is connected by a conductor 6 to one input terminal of a converter N. The other input terminal of the converter N is connected by a conductor 7 to the junction 8 of the bridge resistors 3 and 4. The converter N serves to convert unidirectional current flowing through the conductors 6 and 7 into alternating current of a predetermined frequency and of one phase or of the opposite phase according to the direction in which unidirectional current flows through the conductors 6 and 7. As those skilled in the art will understand, current flow through the conductors 6 and 7 can normally occur only when the voltage of the thermocouple increases above or falls below the opposing potential difference between wiper contact C and bridge point 8. When such unbalance occurs, the current flow through the thermocouple will be in one direction or in the opposite direction accordingly as the thermocouple voltage is respectively greater or less than the potential difference between the contact C and bridge point 8.

The alternating output voltage signal of the converter N is amplified in an electronic voltage amplifier O and the amplified output voltage signal of the amplifier O is impressed on the input circuit of a power amplifier P through a conductor 9 and ground connections 10.

As shown, the power amplifier P includes the two secondary windings 11 and 12 of a transformer Q having its primary winding 13 connected across conductors $L^{10}$ and $L^{20}$ which may be connected to a source of alternating current of conventional frequency and voltage, for example, 60 cycles per second and 115 volts. The converter N and voltage amplifier O are energized by alternating current supplied through branch conductors 14 from the supply conductors $L^{10}$ and $L^{20}$. As shown, the secondary transformer windings 11 and 12 are arranged end to end and have their adjacent ends connected at the junction point 15. The second end of the winding 11 is connected to the anode of an electronic valve R and the second end of the secondary winding 12 is connected to the anode of an electronic valve S. The cathode of the valve R is connected to the transformer junction point 15 through the winding of an electro-magnet R', and the cathode of the valve S is connected to the junction point 15 through the winding of an electro-magnet S'. The valves R and S may be, and, as shown are, vacuum triode tubes, but as those skilled in the art will understand, they may well be valves each having more than 3 electrodes and, with circuit modifications the valves may be thyratrons. The previously mentioned output terminal 9 of the voltage amplifier O is connected to the control grids of the two valves.

The electro-magnets R' and S' are arranged end to end with their adjacent ends at opposite sides of the armature $M^2$ carried by the upper extension of the flapper valve M. The windings of the electro-magnets R' and S' are so formed and arranged as to have no significant operative effect on the armature $M^2$ tending to move the flapper M out of its neutral position when the measuring bridge circuit A is balanced. When the circuit A is balanced, there is no current flow through the thermocouple TC, or input circuit of the converter N, and no signal is impressed on the input circuits of the valves R and S. However, when the circuit A is unbalanced, current flows through the thermocouple TC, and the converter N then impresses an alternating current signal on the amplifier O, and the latter impresses an amplified signal on the control grids of the valves R and S, and thereby effectively energizes one of those valves to correspondingly deflect the flapper M.

Which of the valves is effectively energized when the bridge circuit A is unbalanced, depends on the direction of circuit unbalance. As previously indicated, the phase of the signal impressed on the amplifier, and hence the phase of the signal impressed on the control grids of the valves R and S, when the unbalance results from current flow through the thermocouple TC is in one direction, is displaced approximately 180° from the phase of the signal impressed on said grids when the unbalance is due to current flow in the opposite direction through the thermocouple TC. The phase of the signals impressed on the control grids of the valves R and S are so related to the phase of the anode currents of those valves that only one of those valves is effectively energized on an increase in the thermocouple voltage and only the other of the two valves is effectively energized on a decrease in the thermocouple voltage.

The circuit network shown diagrammatically in Fig. 1 is similar to the well-known and widely used circuit network disclosed in the Wills Patent No. 2,423,540 of July 8, 1947, wherein power amplifier valves, corresponding to the valves R and S, energize the control winding of a two phase reversibly rotatable electric motor for rotation of the motor in one direction or the other depending on the direction of unbalance. In consequence, further explanation in respect to the circuit network diagrammatically illustrated in Fig. 1 is unnecessary herein.

With the particular arrangement shown in Fig. 1, on an increase in the thermocouple voltage, the valve S is effectively energized and the relay S' turns the flapper valve M clockwise, and thereby causes the piston E, contact C and indicator I to move to the right. Conversely, on a decrease in the thermocouple voltage, the valve R is effectively energized and the piston E, contact C and indicator I are moved to the left.

The apparatus disclosed in Fig. 1 is relatively simple, and has special advantages for certain uses, particularly when the apparatus is to be used to control the operation of air controllers so that the potentiometer rebalancing apparatus may be supplied with air under pressure from the source of air under pressure supplied to the air control apparatus.

The present invention may take various forms, and one modification of the apparatus shown in Fig. 1 is illustrated in Figs. 2 and 3. The apparatus shown in Figs. 2 and 3 differs significantly from that shown in Fig. 1 only in respect to the manner in which the anode currents flowing through the electronic valves R and S control the air pressure transmitted from the supply pipe J to the opposite ends of the air motor cylinder D'. Elements shown in Fig. 2 which are like elements shown in Fig. 1, are designated by the same reference symbols. In Figs. 2 and 3, the pressure transmitted to the air cylinder by the pipe $K^2$ is regulated by an electro-magnetic bleeder mechanism unit T, and the pressure of the air transmitted to the cylinder D' by the pipe $L^2$ is controlled by an electro-magnetic bleeder mechanism unit U. The latter may be, and as shown is, identical in construction with the unit T, and the following description of the unit T makes it unnecessary to describe the unit U in detail.

The mechanism unit T comprises a core body 20 of mumetal or other magnetic material having good permeability. The body 20 is shown as a cylinder having one closed end and one open end, and having a central pole portion 21. The latter is attached to the closed end or yoke portion, of the core body 20, and is surrounded by an annular air space 22. The air space 22 is in communication with the air pipe $K^2$ through a branch pipe $K^3$, the similar air space of the unit U being in communication with the pipe $L^2$ through a branch $L^3$. A flexible diaphragm 23, which may be formed of beryllium copper, extends across the open end of the space 22 and has its peripheral portion clamped against the end of the rim portion of the body T by the peripheral portion of a relatively thick disc member 24 of mumetal or other magnetic material of good permeability. The member 24 may have its peripheral portion welded or screw-connected to the rim portion of the body 20. The side of the member 24 adjacent the diaphragm 23 is cut away to permit the central portion of the diaphragm to be deflected or bent outwardly. The diaphragm 23 is formed with a small, conical, central, inwardly extending, protrusion with a hole 25 in its tip portion. The hole 25 constitutes a bleed orifice for the unit T. The rigid end member 24 is formed with a central opening in register with, and of substantially greater cross sectional area than the orifice 25, so as to insure that the outer side of the diaphragm 23 is subjected to atmospheric pressure at all times.

As shown, the bleed orifice 25 is variably throttled in response to variations in a control current flowing through a solenoid winding $R^2$ surrounding the central pole portion 22 of the device T. The winding $R^2$ is connected between the anode of the valve R and the left end terminal of the transformer Q secondary winding 11 remote from the secondary winding 12. In Fig. 2, the cathode of the valve R is shown connected to ground through a resistor 26. The anode of the valve S of Fig. 2 is connected to the right end of the secondary winding 12 of the transformer Q, through a solenoid winding $S^2$ surrounding the central core part of the unit U. The cathode of the valve S is connected to ground by a resistor 27.

The variations in the control current flowing through the winding $R^2$ create an electro-magnetic force which subjects the bleed orifice 25 of the unit T to a variable throttling effect. As shown, that throttling action is directly due to the magnetic attractive force acting between the end member 24 and a body 30 of mumetal or other magnetic material in the air space 22 of the unit T. As shown, the body 30 is in the form of an oblong block and is mounted on a spring 31 which may be made of beryllium copper. The body 30 is arranged adjacent the diaphragm 23 and is loosely received in a slot 21' formed in the end of the pole portion 21.

The magnitude of the parts 21, 24 and 30 may be made great enough to insure the application of force to the diaphragm 23 by the member 30 ample to insure the desired throttling restriction of the bleed orifice as the air pressure in the chamber 22 is being increased or decreased. When a static balance condition is established, the member 30 and diaphragm form a hovering bleed nozzle and valve unit which is highly sensitive to small changes in the air pressure in chamber 22.

The mechanism shown in Fig. 3 was invented by Frederick W. Side and is disclosed and claimed in his application for patent Serial No. 260,407, filed December 7, 1951.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Null type, self-balancing measuring apparatus comprising a normally balanced potentiometric bridge circuit including a slide wire resistor, a wiper contact adjustable along said resistance to rebalance said circuit when unbalanced by a change in the quantity measured, means including an amplifier having an output circuit for developing in said output circuit an alternating current signal proportional to the existing circuit unbalance and of one phase or the opposite phase, depending on the direction of unbalance, an air motor operatively connected to said wiper contact to adjust the latter along said resistor in the direction required to rebalance said circuit, and motor controlling mechanism selectively operable to actuate the motor for adjustment of the wiper contact along said resistor in either direction, comprising a pair of electronic valves each including an anode, a cathode and a control grid, each of said grids being connected in the output circuit in which said signal is developed when the bridge circuit is unbalanced and each of said valves having a separate output circuit including a relay winding and a source of alternating current of the same frequency as said signal and of a phase opposite to the phase of the other source of current and so related to the first mentioned phases that when said bridge circuit is unbalanced in one direction or the other the motor is actuated for operation in the direction to eliminate the existing bridge circuit unbalance by the current flow in one or the other of said relay windings.

2. Measuring apparatus as specified in claim 1, in which said air motor is a cylinder containing a piston movable longitudinally of the cylinder and operatively connected to said contact and in which said windings selectively control the flow of air under pressure into one end of the cylinder while permitting the escape of air from the other end of the cylinder.

3. Measuring apparatus as specified in claim 1, in which said air motor comprises a cylinder and a piston within and movable longitudinally of the cylinder and operatively connected to said contact, and comprising conduit means for separately connecting each end of the cylinder through a separate restricted passage to a source of air under pressure, said conduit means having a separate bleed orifice between each restriction and the corresponding cylinder end and flapper valve means selectively subjecting each bleed orifice to an increased or decreased throttling action while subjecting the other bleed orifice to a decreased or increased throttling action, respectively, to thereby adjust said contact in the direction to rebalance the bridge circuit when unbalanced.

4. Measuring apparatus as specified in claim 3, in which the two bleed orifices face one another and in which a flapper valve extending between the two bleeder outlets is selectively movable to increase its throttling effect on either orifice while diminishing its throttling effect on the other orifice, following a change in the strength of the current flowing in one of said windings relative to the current flowing in the other of said windings.

References Cited in the file of this patent

UNITED STATES PATENTS

| Number | Name | Date |
|---|---|---|
| 2,257,203 | Thacker | Sept. 30, 1941 |
| 2,262,173 | Fischer | Nov. 11, 1941 |
| 2,328,163 | Moore | Aug. 31, 1943 |
| 2,398,421 | Frische et al. | Apr. 16, 1946 |
| 2,403,917 | Gille | July 16, 1946 |
| 2,423,540 | Wills | July 8, 1947 |
| 2,423,935 | Hart, Jr. | July 15, 1947 |
| 2,523,198 | Davies | Sept. 19, 1950 |
| 2,528,054 | Harrison | Oct. 31, 1950 |
| 2,644,426 | Moore | July 7, 1953 |